(12) United States Patent
Chen (10) Patent No.: US 7,059,441 B2
(45) Date of Patent: Jun. 13, 2006

(54) MOUNT FRAME FOR AN ELECTRIC MOTOR-DRIVEN WHEELED VEHICLE

(75) Inventor: Jui-Tien Chen, Kaohsiung (TW)

(73) Assignee: Kwang Yang Motor Co. Ltd., Kaohsiung (TW)

( * ) Notice: Subject to any disclaimer, the term of this patent is extended or adjusted under 35 U.S.C. 154(b) by 203 days.

(21) Appl. No.: 10/758,030

(22) Filed: Jan. 14, 2004

(65) Prior Publication Data

US 2004/0144589 A1    Jul. 29, 2004

(30) Foreign Application Priority Data

Jan. 21, 2003 (EP) .................................. 03250375

(51) Int. Cl.
 *B62D 21/12* (2006.01)
(52) U.S. Cl. ...................... 180/208; 180/215; 180/216; 280/785; 280/639; 297/344.18; 403/320
(58) Field of Classification Search ................ 180/208, 180/209, 210, 215, 216; 280/785, 38, 639; 297/344.18; 403/DIG. 4, 314, 320, 109.5
See application file for complete search history.

(56) References Cited

U.S. PATENT DOCUMENTS

| | | | | |
|---|---|---|---|---|
| 3,278,229 | A * | 10/1966 | Bates ..................... | 297/344.18 |
| 3,327,985 | A * | 6/1967 | Levit et al. ................. | 248/408 |
| 4,148,524 | A * | 4/1979 | Guyton .................. | 297/344.18 |
| 4,909,525 | A * | 3/1990 | Flowers ....................... | 280/30 |
| 5,036,938 | A * | 8/1991 | Blount et al. ............... | 180/208 |
| 5,074,372 | A * | 12/1991 | Schepis ....................... | 180/208 |
| 5,101,920 | A * | 4/1992 | Peterson ...................... | 180/11 |
| 5,154,251 | A * | 10/1992 | Fought ....................... | 180/208 |
| 5,522,642 | A * | 6/1996 | Herzog .................. | 297/344.18 |
| 5,865,560 | A * | 2/1999 | Mercat et al. ........... | 403/322.4 |
| 5,941,327 | A | 8/1999 | Wu ............................ | 180/65.1 |
| 6,170,592 | B1 * | 1/2001 | Wu .............................. | 180/208 |
| 6,273,206 | B1 * | 8/2001 | Bussinger ................... | 180/208 |
| 6,336,517 | B1 * | 1/2002 | Cheng ......................... | 180/208 |
| 6,439,331 | B1 * | 8/2002 | Fan ............................ | 180/208 |
| 6,530,446 | B1 * | 3/2003 | Lin ............................ | 180/208 |
| 6,896,084 | B1 * | 5/2005 | Lo ............................. | 180/208 |

FOREIGN PATENT DOCUMENTS

JP         11-9627      *   1/1999

* cited by examiner

*Primary Examiner*—Paul N. Dickson
*Assistant Examiner*—George D. Spisich
(74) *Attorney, Agent, or Firm*—Allston L. Jones (57) ABSTRACT

A mount frame includes a first frame unit having a first rear frame portion which is provided with an anchoring member and a gripped member. A second frame unit has a second front frame portion provided with a seat post, an anchored member which is disposed to be journalled on the anchoring member about a rotational axis. Thus, the second frame unit is rotatable relative to the axis to facilitate assembly of the first rear frame portion and the second front frame portion. A gripping member is disposed on the second front frame portion to confront the gripped member. A tightening unit is disposed to push the gripping member to abut tightly against the gripped member.

5 Claims, 10 Drawing Sheets

MOUNT FRAME FOR AN ELECTRIC MOTOR-DRIVEN WHEELED VEHICLE

CROSS-REFERENCE TO RELATED APPLICATION

This application claims priority of European Patent Application No. 03250375.7, filed on Jan. 21, 2003.

BACKGROUND OF THE INVENTION

1. Field of the Invention

This invention relates to a mount frame for an electric motor-driven wheeled vehicle, more particularly to a mount frame with two frame units which are capable of being journalled to each other so as to facilitate assembly thereof.

2. Description of the Related Art

Figure 1:
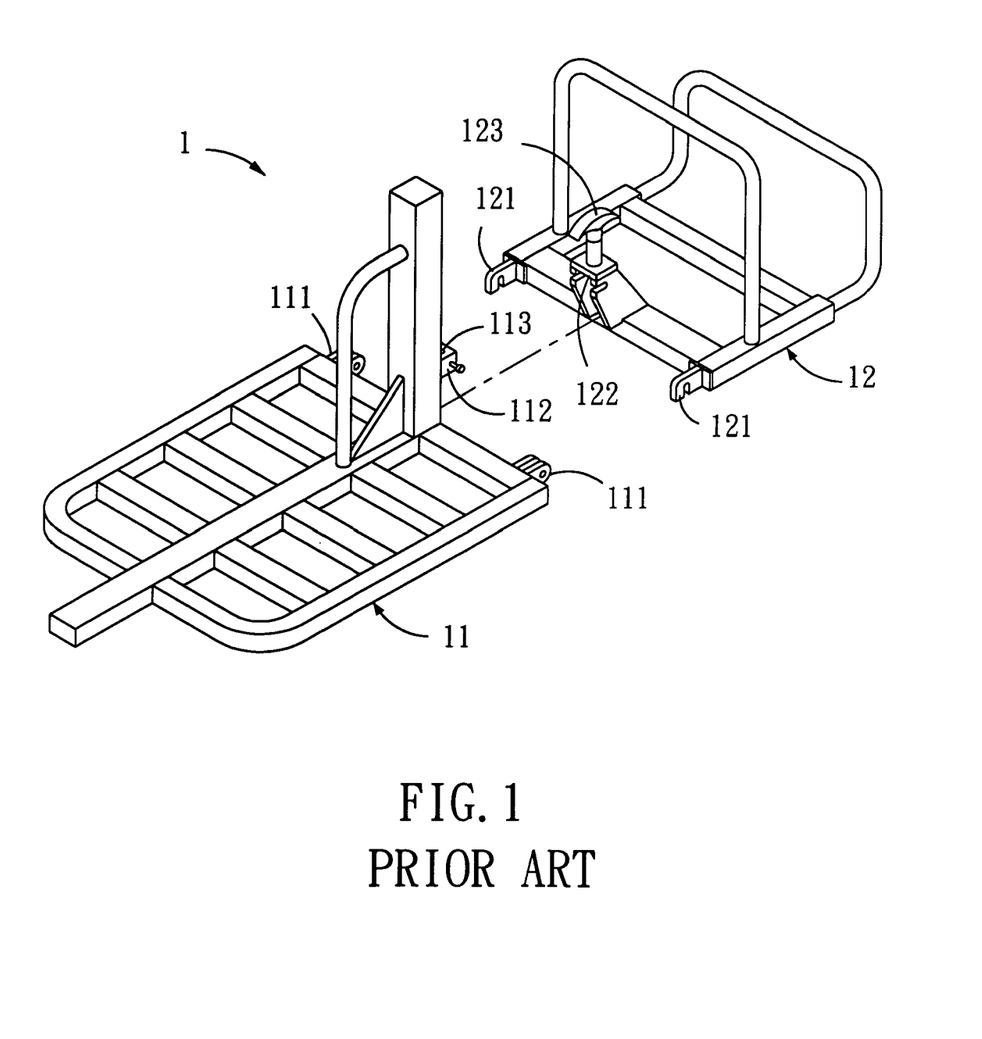
FIG. 1 is an exploded perspective view of a conventional mount frame for an electric motor-driven wheeled vehicle.

Referring to FIG. 1, a conventional mount frame 1 for an electric motor-driven wheeled vehicle is shown to include front and rear frame units 11, 12. The front frame unit 11 has two anchored members 111 and an engaging block 112 with an engaging hole 113 formed therein. The rear frame unit 12 has two anchoring members 121, a mount seat 122, and a pull rod 123 mounted on the mount seat 122. In assembly, the front and rear frame units 11, 12 are placed on the ground. The user needs to hold the front frame unit 11 with one hand, and the rear frame unit 12 with the other hand, and move the rear frame unit 12 toward the front frame unit 11 such that the anchoring members 121 anchor the anchored members 111. Then, the rear frame unit 12 is pushed such that the pull rod 123 can be inserted into the engaging hole 113.

However, during assembly, since the user needs to hold the front frame unit 11 with one hand, the front frame unit 11 may fall down or slant, thereby resulting in disengagement of the anchoring and anchored members 121, 111. Therefore, assembly of the mount frame 1 is inconvenient and laborious to conduct.

SUMMARY OF THE INVENTION

The object of the present invention is to provide a mount frame with two frame units which can be assembled and disassembled conveniently.

According to this invention, the mount frame includes a first frame unit, a second frame unit, and a tightening unit.

The first frame unit includes first front and rear frame portions opposite to each other in a first longitudinal direction. The first rear frame portion has an anchoring member with a bearing wall that faces in a first upright direction transverse to the first longitudinal direction, and a gripped member with a gripped wall that faces in the first longitudinal direction.

The second frame unit includes second front and rear frame portions opposite to each other in a second longitudinal direction. The second front frame portion has a seat post member which is elongated in a second upright direction transverse to the second longitudinal direction, and an anchored member which extends in an axial direction transverse to the second longitudinal and upright directions and which is disposed to be journalled on the bearing wall of the anchoring member about a rotational axis in the axial direction. As such, the second rear frame portion is rotatable relative to the first frame unit about the rotational axis between a first position, where the second upright direction is coincident with the first longitudinal direction, and a second position, where the second longitudinal and upright directions are coincident with the first longitudinal and upright directions, respectively. The second front frame portion further has a gripping member with a gripping wall that is to be brought to confront the gripped wall of the gripped member in the first longitudinal direction when the second rear frame portion is turned from the first position to the second position.

The tightening unit is disposed to push the gripping wall to abut tightly against the gripped wall when the second rear frame portion is in the second position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 2:
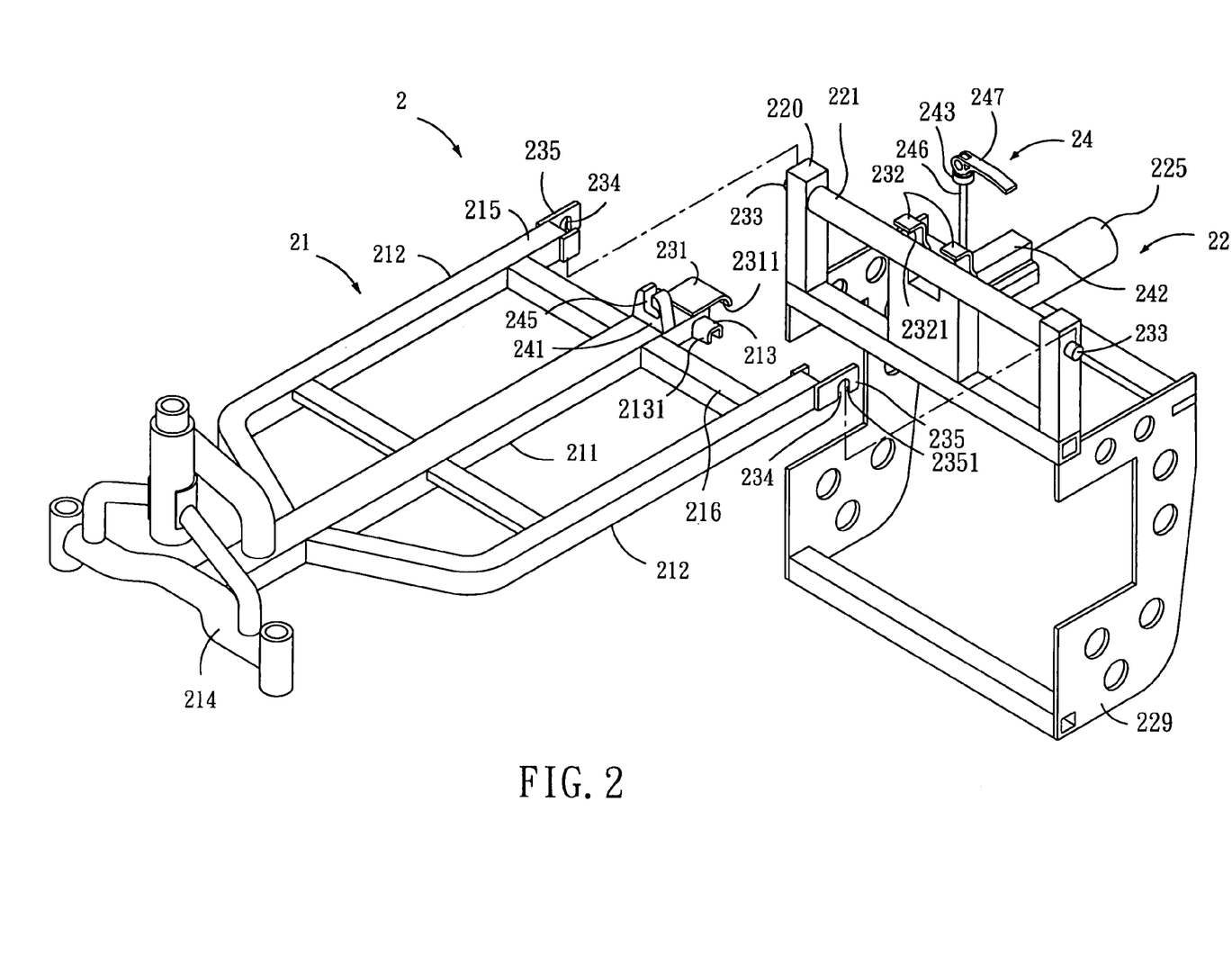
FIG. 2 is an exploded perspective view of a preferred embodiment of a mount frame for an electric motor-driven wheeled vehicle according to this invention prior to assembly.

Referring to FIG. 2, the preferred embodiment of a mount frame for an electric motor-driven wheeled vehicle according to the present invention is shown to comprise first and second frame units 21, 22, and a tightening unit 24.

The first frame unit 21 includes first front and rear frame portions 214, 215 opposite to each other in a first longitudinal direction. The first rear frame portion 215 includes a rear end support 216 which extends in an axial direction transverse to the first longitudinal direction, and central, right and left cantilevers 211, 212 which extend from the rear end support 216 in the first longitudinal direction. The central cantilever 211 is spaced apart from and is flanked by the right and left cantilevers 212.

The first rear frame portion 215 has an anchoring member and two gripped members 213. The anchoring member includes left and right lugs 235 which are disposed respectively on the left and right cantilevers 212 and which have left and right bearing walls 2351 that face in a first upright direction transverse to both the first longitudinal direction and the axial direction and that respectively confine left and right downwardly opened cavities 234, and a central lug 231 which is disposed on the central cantilever 211 and which is provided with a central bearing wall 2311. The gripped members 213 are disposed on the central cantilever 211 at two sides of the central lug 231, and respectively have gripped walls 2131 which face in the first longitudinal direction.

The second frame unit 22 includes second front and rear frame portions 220, 229 opposite to each other in a second longitudinal direction. The second front frame portion 220 has a seat post member 225 which is elongated in a second upright direction transverse to the second longitudinal direction. An anchored member includes an axial shaft 221 which extends along a rotational axis in the axial direction and which is disposed to be journalled on the central bearing wall 2311 of the central lug 231, and right and left pins 233 which are disposed opposite to each other along the rotational axis and outboard to the axial shaft 221 and which are disposed to be respectively received in the right and left downwardly opened cavities 234 so as to be rotatable on the right and left bearing walls 2351, respectively. The second front frame portion 220 further has two gripping members 232, each of which has a gripping wall 2321.

Figure 3:
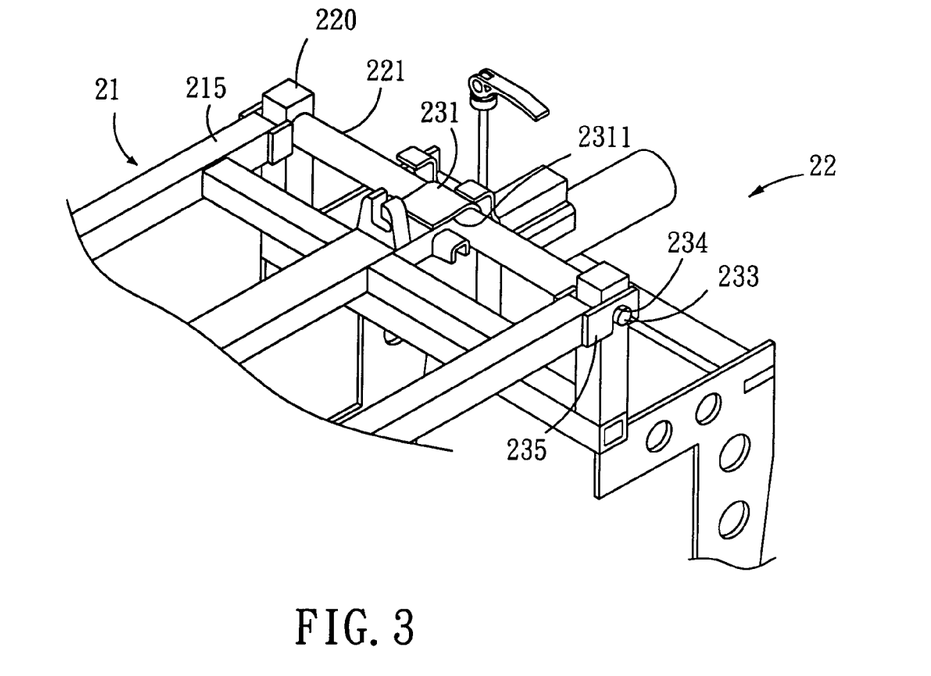
FIG. 3 is a fragmentary perspective view illustrating first and second frame units of the preferred embodiment in a first assembled state.
Figure 4:
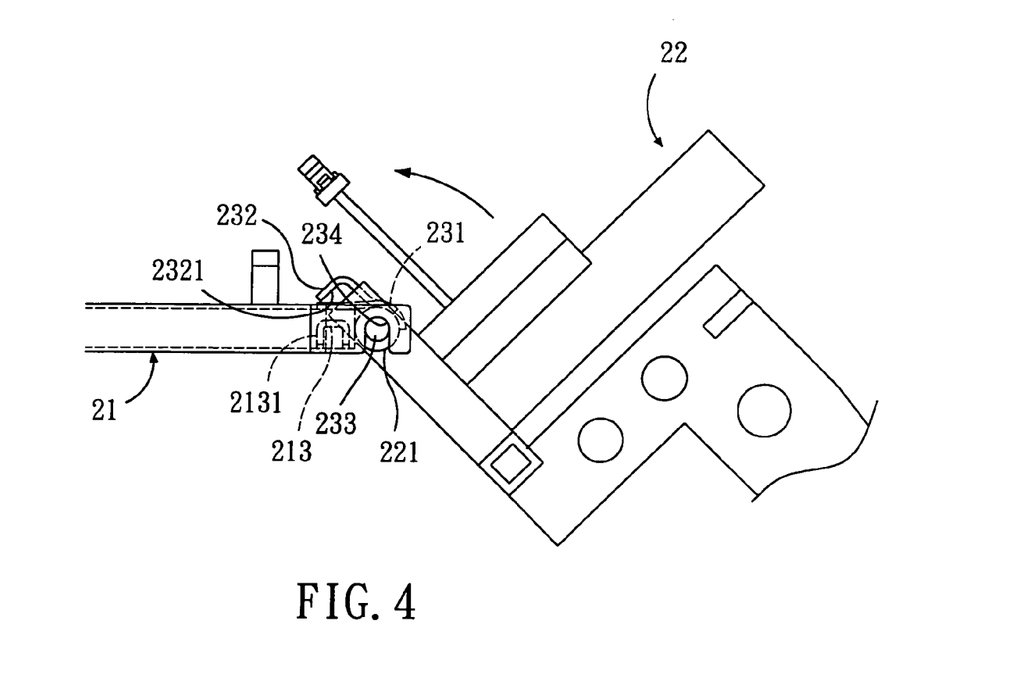
FIG. 4 is a fragmentary side view illustrating the first and second frame units when shifted from the first assembled state to a second assembling state.
Figure 5:
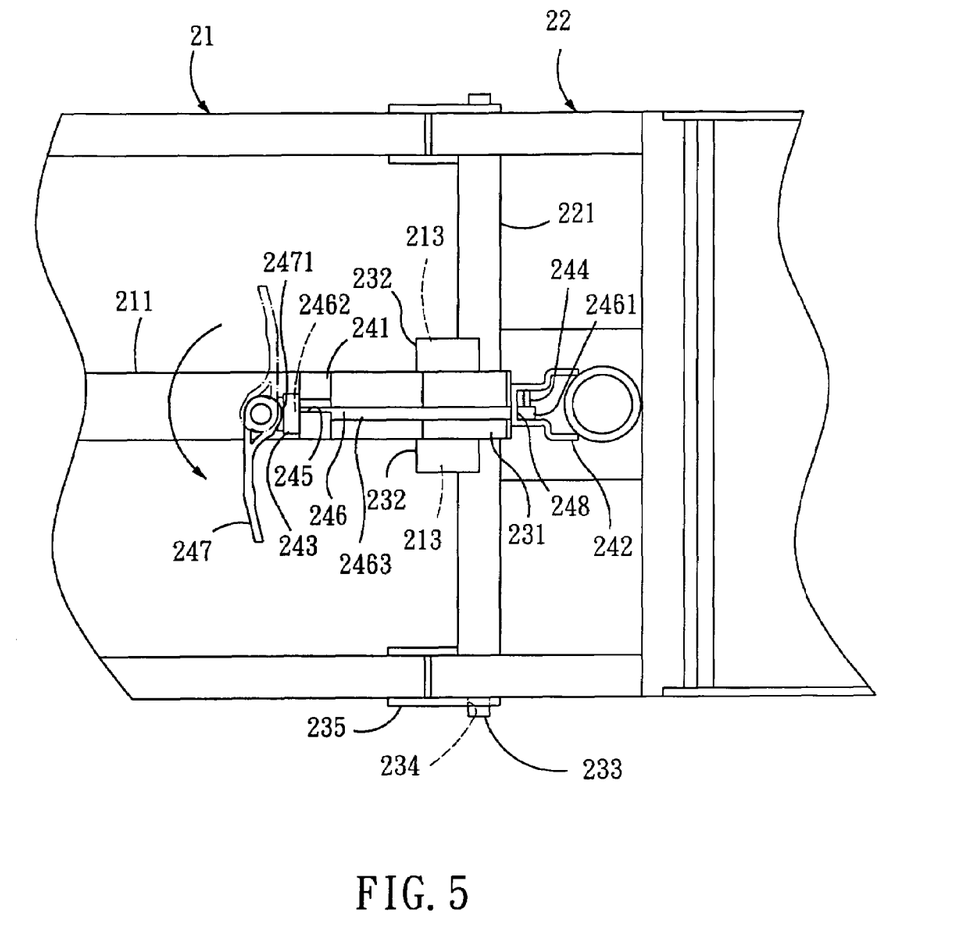
FIG. 5 is a fragmentary top view illustrating the first and second frame units in a locked state.
Figure 6:
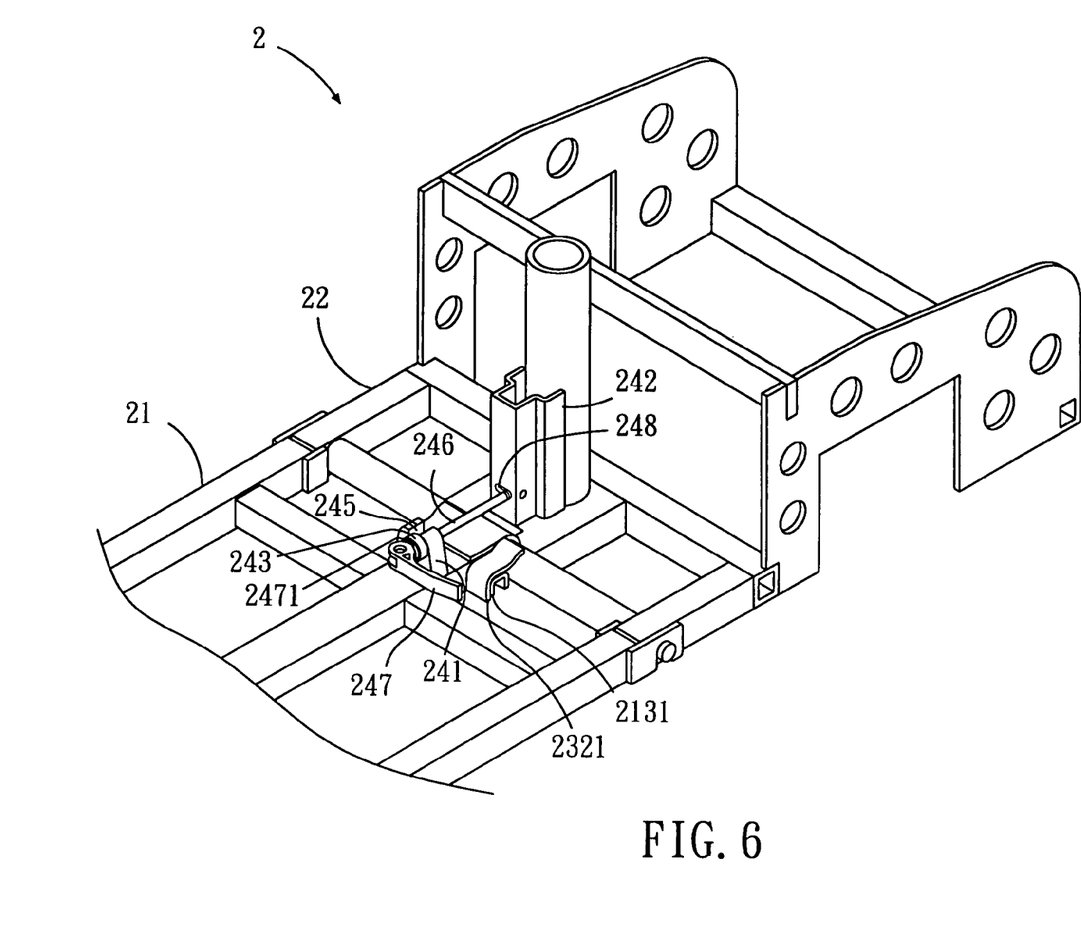
FIG. 6 is a fragmentary perspective view illustrating the first and second frame units in the locked state.

As such, referring to FIGS. 3 to 6, when the axial shaft 221 and the right and left pins 233 are journalled on the central lug 231 and the right and left lugs 235, the second rear frame portion 229 of the second frame unit 22 is rotatable relative to the first frame unit 21 about the rotational axis between a first position, as shown in FIG. 3, where the second upright direction is coincident with the first longitudinal direction, and a second position, as shown in FIGS. 5 and 6, where the second longitudinal and upright directions are coincident with the first longitudinal and upright directions, respectively, and where the gripping walls 2321 of the gripping members 232 are brought to confront the gripped walls 2131 of the gripped member 213 in the first (or second) longitudinal direction.

The tightening unit 24 includes a mount seat 241 which is disposed on the central cantilever 211 in front of the central lug 231. The mount seat 241 has an uprightly opened retaining groove 245 which extends therethrough in the first longitudinal direction, and which includes an uprightly opened insert segment and an axially extending retaining segment. With reference to FIG. 5, a connecting rod 246 has a connecting end 2461 which passes through a hole 248 (see FIG. 5) in a base seat 242 that is secured on the second rear frame portion 220 and which is threadedly engaged with a screw fastener 244 so as to be mounted on a base seat 242, an actuated end 2462 which is opposite to the connecting end 2461 along a displacement line (in the second upright direction in this embodiment), an abutting wall 243 which is mounted on and which is movable relative to the actuated end 2462 along the displacement line, and a middle segment 2463 which is interposed between the connecting and actuated ends 2461, 2462. The middle segment 2463 is disposed to be inserted into the uprightly opened retaining groove 245 in the mount seat 241 when the second rear frame portion 229 is turned from the first position to the second position. Moreover, in the second position, the abutting wall 243 is disposed forwardly of and confronts the mount seat 241 in the first (or second) longitudinal direction.

A cam member 247 is mounted on and is pivotable to the actuated end 2462 of the connecting rod 246 about a first pivoting axis which is transverse to the displacement line. The cam member 247 has a cam surface 2471 which is configured in a known manner such that when the cam member 247 is turned about the first pivoting axis from an unlocked position (as indicated by dotted lines in FIG. 5) to a locked position (as indicated by solid lines in FIG. 5), the cam surface 2471 is moved from a loose engagement with the mount seat 241 to a tight engagement with the mount seat 241.

In assembly, referring to FIG. 3, the first rear frame portion 215 of the first frame unit 21 is first located above the second front frame portion 220 of the second frame unit 22 which is in the first position. Then, the central lug 231 is brought to anchor the axial shaft 221, and the right and left lugs 235 are brought to respectively anchor the right and left pins 233. Thus, the user does not need to hold the first frame unit 21 to prevent separation of the first frame unit 21 from the second frame unit 22.

Subsequently, referring to FIG. 4, the second frame unit 22 is turned about the rotational axis to the second position in a direction indicated by the arrow so that the first and second longitudinal directions coincide with each other, thereby placing the first and second frame units 21, 22 in on the same plane. In this position, referring to FIG. 5, the gripping members 232 are brought to engage the gripped members 213. In addition, the middle segment 2463 of the connecting rod 246 is inserted retainingly into the retaining groove 245. Thereafter, referring to FIG. 6, the cam member 247 is turned from the unlocked position to the locked position so that the cam surface 2471 is in a tight engagement with the mount seat 241, thereby completing assembly of the mount frame 2. Disassembly of the mount frame 2 can be conducted by following the aforesaid steps in a reverse manner.

Figure 7:
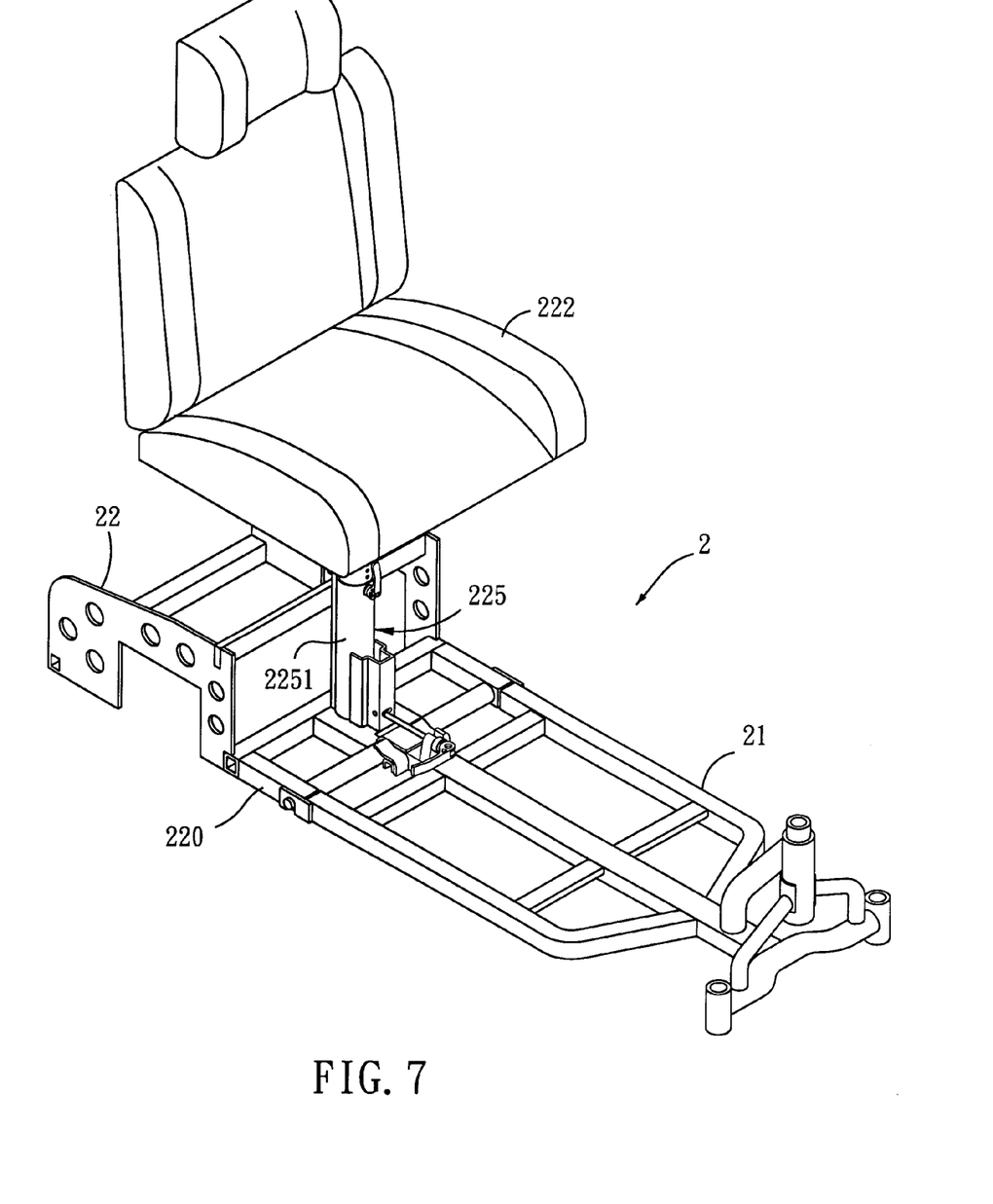
FIG. 7 is a perspective view illustrating a seat when mounted on the second frame unit.
Figure 8:
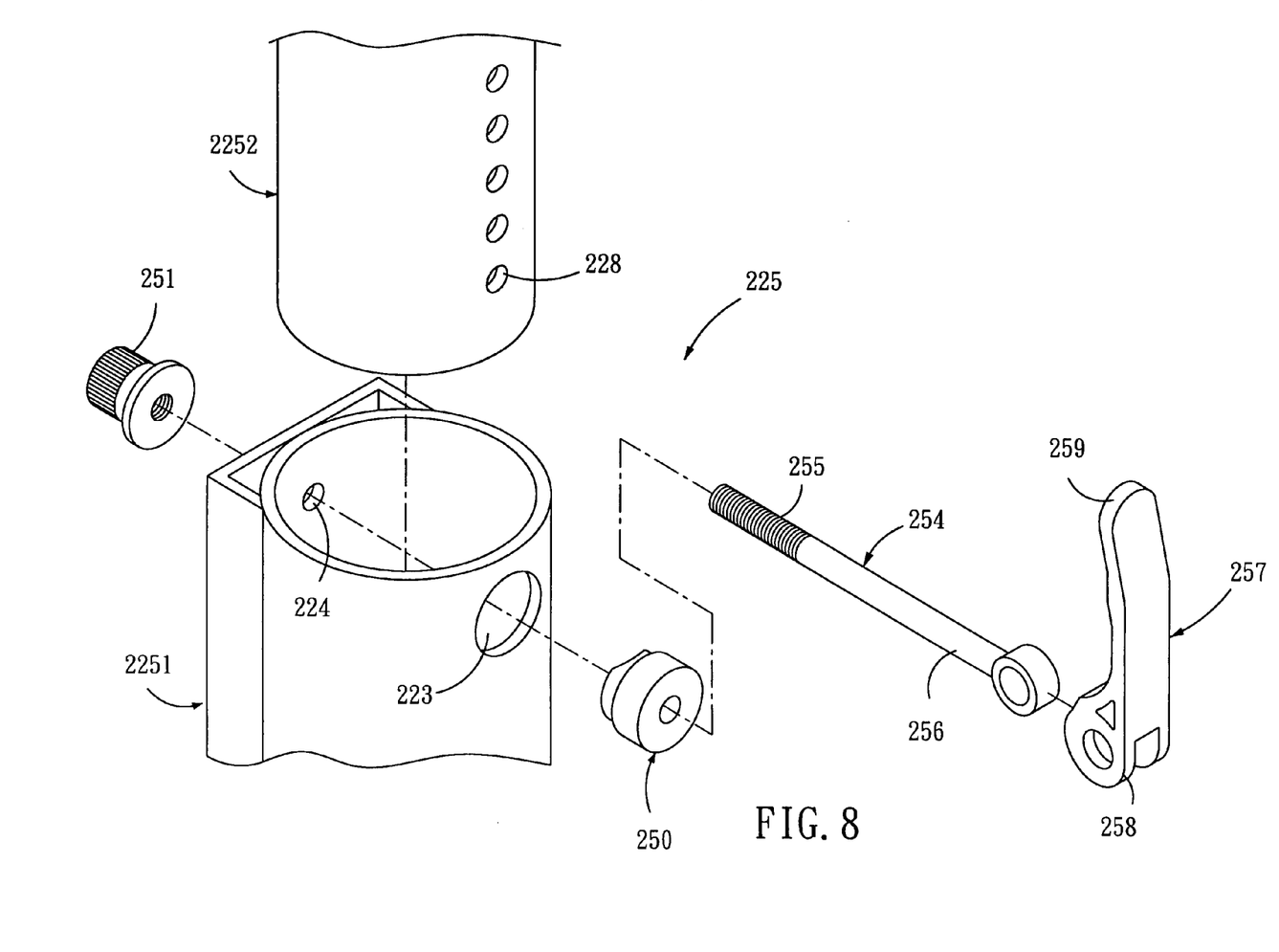
FIG. 8 is a fragmentary exploded perspective view of a locking unit for locking a seat post of the second frame unit.

Referring to FIGS. 7 and 8, the seat post member 225 includes a seat tube 2261 which is formed integrally on and which extends from the second front frame portion 220 of the second frame unit 22 in the second upright direction, and a seat stem 2252 which is adapted to be connected to a seat 222 and which is insertable into the seat tube 2251 along a post axis in the second upright direction.

A locking unit includes a plurality of positioning holes 228 which are formed in the seat stem 2252 and which are aligned with one another along the post axis, a pair of through holes 223, 224 which are formed in the seat tube 2251 and which are diametrically opposed to each other in a first direction, a screw nut 251, a screw bolt 254, an abutting member 250, and an actuating member 257.

Figure 9:
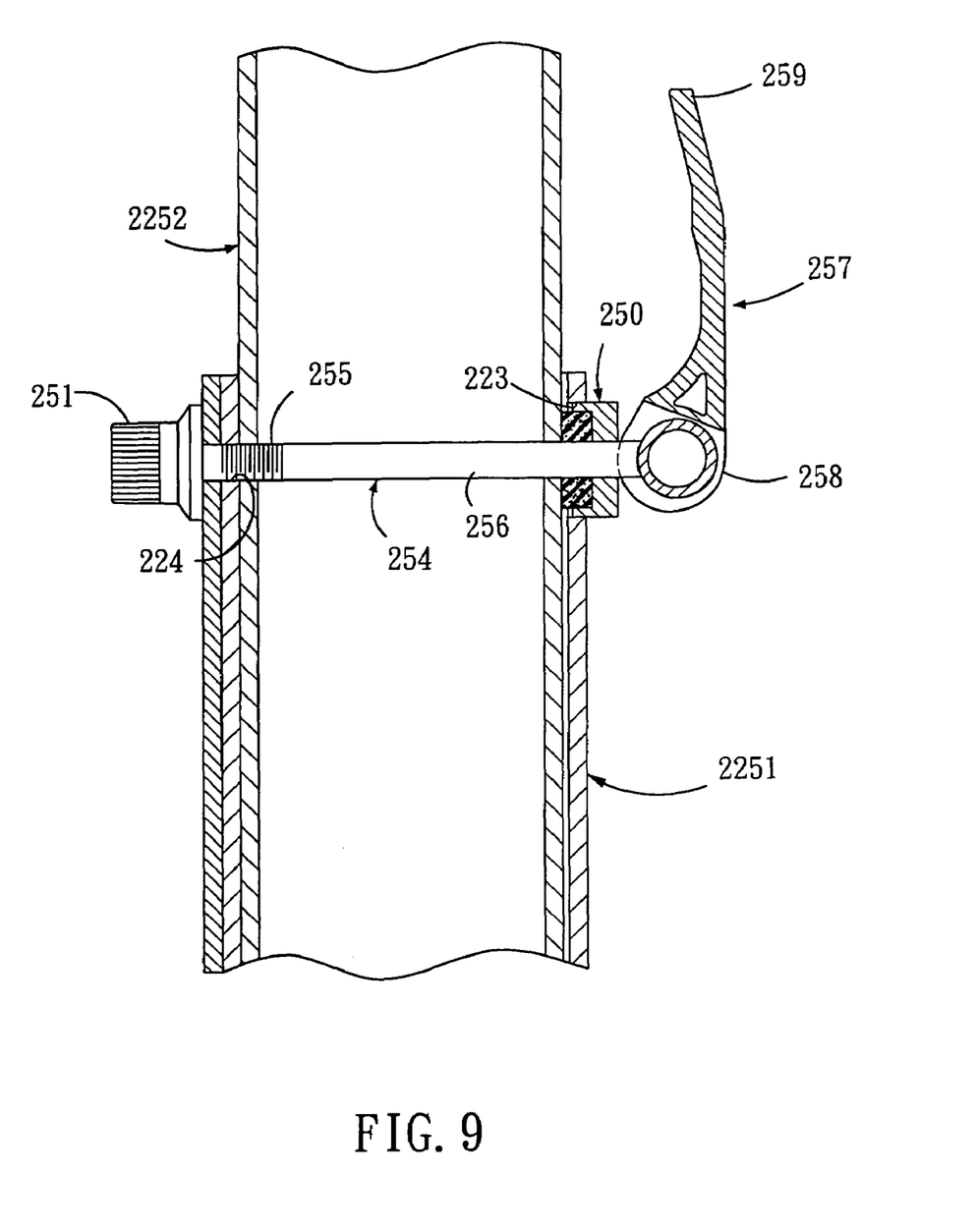
FIG. 9 is a longitudinally sectional view illustrating the locking unit in a tightened state.

With reference to FIG. 9, the screw bolt 254 has a threaded end portion 255 which engages threadedly the screw nut 251 such that the screw nut 251 abuts against the seat tube 2251, and a shank end portion 256 which passes through the through holes 223, 224 and a selective one of the positioning holes 228 to extend outwardly of the seat tube 2251. The abutting member 250 is sleeved on the shank end portion 256 and is configured to be movable in the first direction relative to the shank end portion 256 to abut against the seat stem 2252 through the through hole 223.

Figure 10:
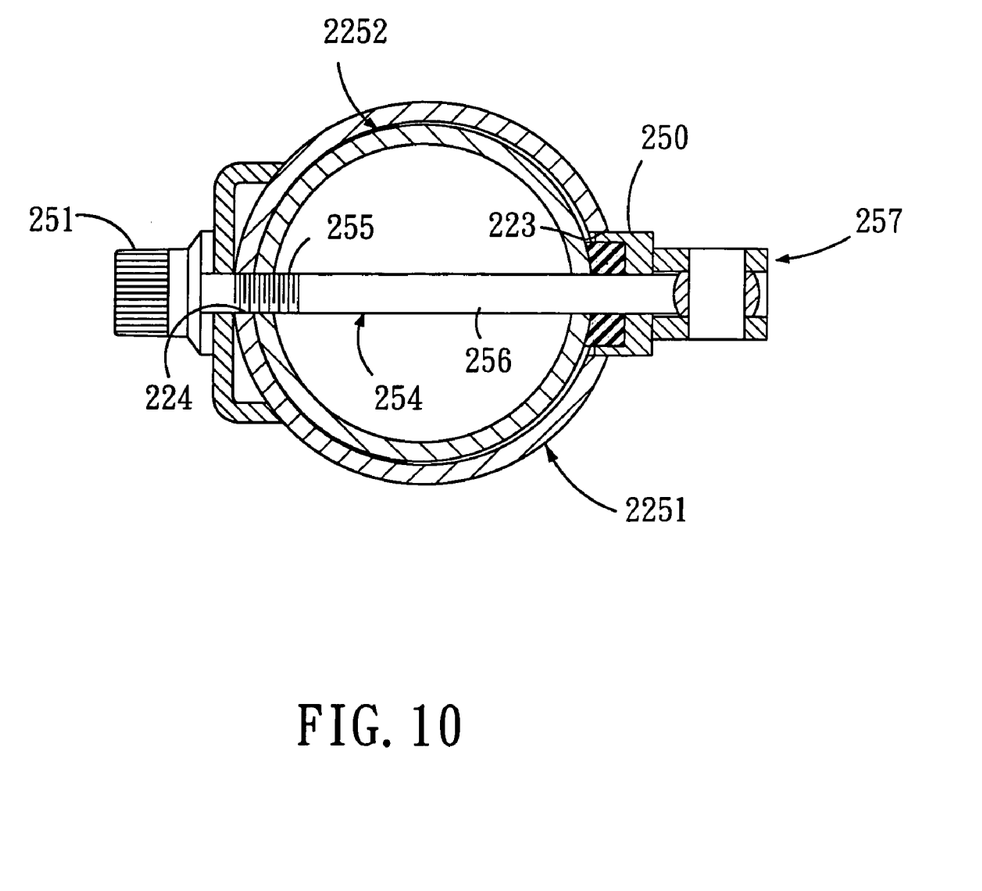
FIG. 10 is a cross-sectional view illustrating the locking unit in the tightened state.
Figure 11:
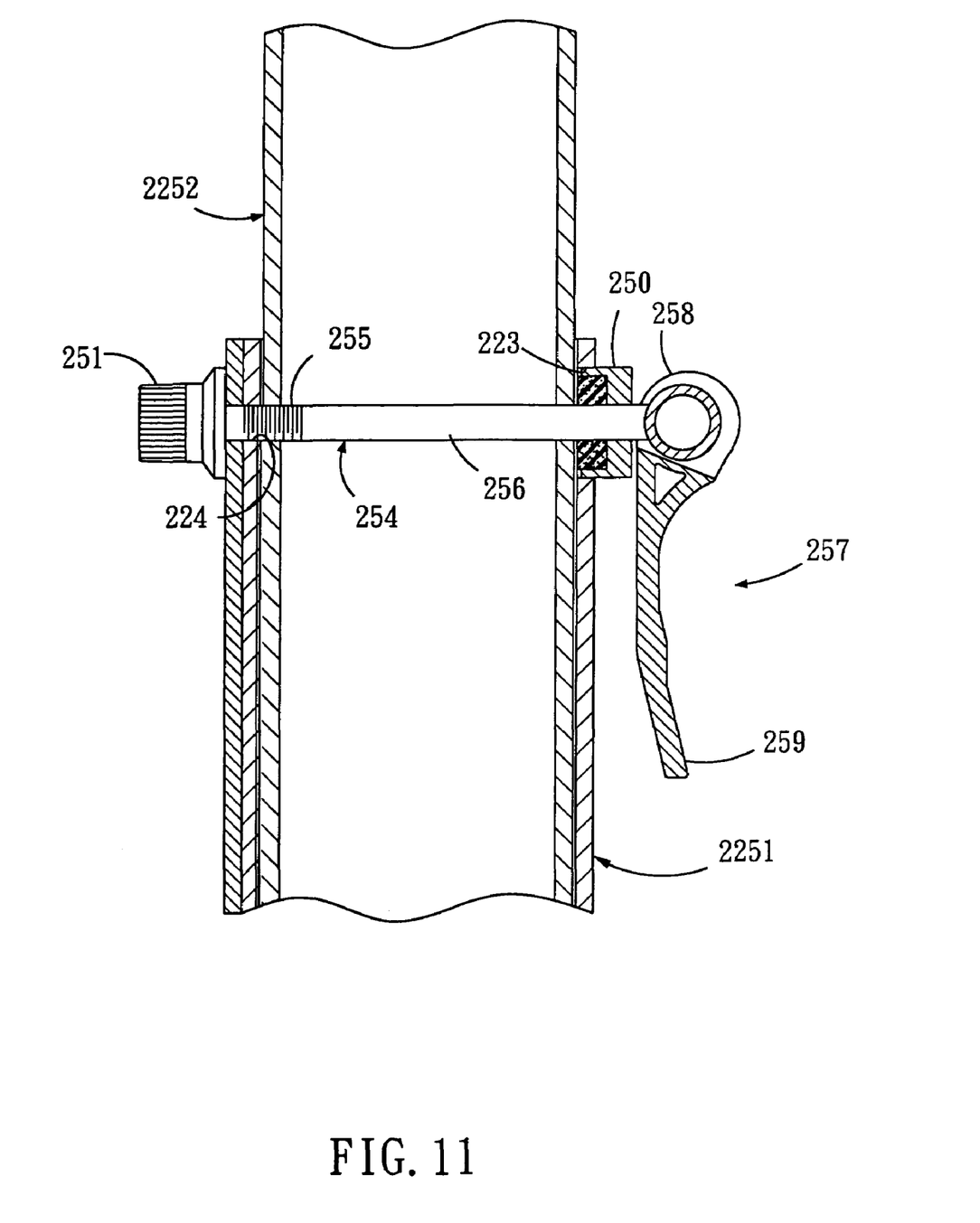
FIG. 11 is a longitudinally sectional view illustrating the locking unit in a loosened state.

The actuating member 257 has a proximate end 258 which is mounted on and which is pivotable to the shank end portion 256 along a second pivoting axis that is transverse to the first direction and the post axis, and a distal end 259 opposite to the proximate end 258. As such, when the distal end 259 is actuated to turn the proximate end 258 about the second pivoting axis from a loosening position (see FIG. 11) to a tightening position (see FIGS. 9 and 10), the proximate end 258 pushes the abutting member 250 to move in the first direction to abut tightly against the seat stem 2252 so as to lock the seat stem 2252 relative to the seat tube 2251.

When it is desired to adjust the height of the seat 222, the proximate end 258 of the actuating member 257 is turned to the loosening position so that the screw nut 251 is easily screwed out of the threaded end portion 255 to permit removal of the screw bolt 254 from the positioning hole 228, thereby permitting movement of the seat stem 2252 relative to the seat tube 2251. The screw bolt 254 is extended through a desired one of the positioning holes 228. Thereafter, the proximate end 258 is turned from the loosening position to the tightening position to secure the seat 22 in position.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A mount frame for an electric motor-driven wheeled vehicle, comprising:
   a first frame unit including first front and rear frame portions opposite to each other in a first longitudinal direction, and
   a second frame unit including second front and rear frame portions opposite to each other in a second longitudinal direction, wherein:
      said first rear frame portion has an anchoring member which has a bearing wall that faces in a first upright direction transverse to the first longitudinal direction, and a gripped member which has a gripped wall that faces in the first longitudinal direction;
      said second front frame portion having a seat post member which is elongated in a second upright direction transverse to the second longitudinal direction, and an anchored member including an axial shaft which extends along a rotational axis in an axial direction transverse to the second longitudinal and upright directions and which is disposed to be journalled on said bearing wall of said anchoring member about the rotational axis and right and left pins which are disposed opposite to each other along the rotating axis and outboard to said axial shaft, such that said second rear frame portion is rotatable relative to said first frame unit about the rotational axis between a first position, where the second upright direction is coincident with the first longitudinal direction, and a second position, where the second longitudinal and upright directions are coincident with the first longitudinal and upright directions, respectively, said second front frame portion further having a gripping member which has a gripping wall that is to be brought to confront said gripped wall of said gripped member in the first longitudinal direction when said second rear frame portion is turned from the first position to the second position;
      said mount frame further comprising a tightening unit disposed to push said gripping wall to abut tightly against said gripped wall when said second rear frame portion is in the second position.

2. The mount frame of claim 1, wherein said first rear frame portion includes a rear end support which extends in the axial direction, and central, left and right cantilevers which extend from said rear end support in the first longitudinal direction, and which are disposed such that said central cantilever is spaced apart from and is flanked by said left and right cantilevers,
   said anchoring member including left and right lugs which are disposed respectively on said left and right cantilevers, and which have left and right bearing walls that serve as said bearing wall and that respectively confine left and right downwardly opened cavities to respectively receive said left and right pins so as to permit said left and right pins to rotate therein, and a central lug which is disposed on said central cantilever and which is provided with a central bearing wall that serve as said bearing wall, on which said axial shaft is journalled.

3. The mount frame of claim 2, wherein said tightening unit includes
   a mount seat disposed on said central cantilever and having an uprightly opened retaining groove which extends through said mount seat in the first longitudinal direction,
   a connecting rod having a connecting end which is mounted on said second rear frame portion, an actuated end which is opposite to said connecting end along a displacement line, an abutting wall which is mounted on and which is movable relative to said actuated end along the displacement line, and a middle segment which is interposed between said connecting and actuated ends, and which is disposed to be inserted into said uprightly opened retaining groove when said second rear frame portion is turned from the first position to the second position, such that said abutting wall is disposed forwardly of and confronts said mount seat in the first longitudinal direction, and
   a cam member mounted on and pivotable to said actuated end about a first pivoting axis which is transverse to the displacement line, said cam member having a cam surface which is configured such that when said cam member is turned about the first pivoting axis from an unlocked position to a locked position, said cam surface is moved from a loose engagement with said mount seat to a tight engagement with said mount seat.

4. The mount frame of claim 1, wherein said seat post member includes a seat tube which is formed integrally on and which extends from said second front frame portion in the second upright direction, and a seat stem which is adapted to be connected to a seat and which is insertable into said seat tube along a post axis in the second upright direction, and a locking unit disposed to releasably lock said seat stem relative to said seat tube.

5. The mount frame of claim 4, wherein said locking unit includes
   a plurality of positioning holes formed in said seat stem and aligned with one another along the post axis,
   a pair of through holes formed in said seat tube and diametrically opposed to each other in a first direction,
   a screw nut,
   a screw bolt having a threaded end portion which engages threadedly said screw nut such that said screw nut abuts against said seat tube, and a shank end portion which passes through said through holes and a selective one of said positioning holes to extend outwardly of said seat tube,
   an abutting member sleeved on said shank end portion and configured to be movable in the first direction relative to said shank end portion so as to abut against said seat stem through said through hole, and
   an actuating member having a proximate end which is mounted on and which is pivotable to said shank end portion along a second pivoting axis that is transverse to the first direction and the post axis, and which is disposed to push said abutting member to move in the first direction to abut tightly against said seat stem when said proximate end is turned about the second pivoting axis from a loosening position to a tightening position.

* * * * *